United States Patent Office 3,589,974
Patented June 29, 1971

3,589,974
DECORATIVE LAMINATE SURFACED WITH A COMPRESSED LAYER OF A FIBRILLATED ACRYLIC FIBER PAPER, SAID PAPER HAVING BEEN TRANSPARENTIZED DURING A HEAT AND PRESSURE CONSOLIDATION STEP AND HAVING BEEN SUBSTANTIALLY FREE OF ANY IMPREGNATING RESIN
Donald Joseph Albrinck, Reading, and Alfred Thomas Guertin, Cincinnati, Ohio, assignors to Formica Corporation, Cincinnati, Ohio
No Drawing. Filed Apr. 24, 1968, Ser. No. 723,924
Int. Cl. B32b 5/25, 27/08
U.S. Cl. 161—150                          10 Claims

ABSTRACT OF THE DISCLOSURE

A heat and pressure consolidated laminate comprising a rigidity imparting base member, a decorative sheet impregnated with melamine-formaldehyde resin and with certain soft thermoplastic acrylic copolymers having a glass transition temperature of less than about 25° C., having bonded thereto a compressed layer of a fibrillated acrylic fiber paper, said paper having been transparentized during the heat and pressure consolidation step and having been substantially free of any impregnating resin and said paper having a basis weight of at least 20 lbs.

BACKGROUND OF THE INVENTION

Decorative laminates have been produced commercially in the United States and other countries of the world for a substantial plurality of years. These decorative laminates contain a plurality of laminae that are heat and pressure consolidated together to form a unitary structure. The surface sheet is a decorative sheet which may be a solid color or may carry a decorative design thereon such as a wood-grain print, floral designs or geometric figures, and the like. The decorative sheet is impregnated as a preliminary step with a noble thermosetting resin. A noble resin is recognized in the industry as being one which does not undergo any significant color deterioration during the consolidation step. The thermosetting resin is converted to the thermoset state during the consolidation. The decorative sheet containing the noble thermosetting resin is then superimposed over one or more core sheets which are generally the kraft paper sheets that have been impregnated with a thermosetting phenolic resin. As before, the thermosetting phenolic resin is converted to the thermoset state during the consolidation step. The number of core sheets can be varied very substantially depending on the thickness of the laminate ultimately desired. When extremely thin laminates are desired, only one core sheet or possibility two core sheets are used. On the other hand, it is frequently desired to make laminates that are 1/32", 1/16" or 1/8" in thickness; or if desired, in even greater thicknesses. In order to get the thicker laminates one simply increases the total number of core sheets to three, five, seven, nine or more. If desired and particularly when the decorative sheet is a printed design, one may superimpose over the decorative sheet an overlay sheet which is generally a fine quality alpha-cellulose paper sheet impregnated with a noble thermosetting resin preferably of the same class as that used to impregnate the decorative sheet; and after the heat and pressure consolidation step is completed the overlay sheet becomes transparentized so that the decorative sheet can readily be seen through the overlay sheet. Some other protective overlay sheets have been used such as films of polyesters. In the past, most of these decorative laminates have found extensive use as horizontal and vertical decorative panels for furniture, kitchen countertops, vanitories and wall siding.

FIELD OF THE INVENTION

The concept of the present invention is in the field of laminated plastic articles and, more particularly, decorative, flexible laminated plastic articles which laminated artticles provide better solvent resistance, impact resistance, formability, scuff and mar resistance when used as a surfacing material for furniture, cabinets, wall panels and the like.

DESCRIPTION OF THE PRIOR ART

The most pertinent reference of which the instant applicants are aware is the U.S. Pat. 3,220,916. Said reference makes use of a hard thermoplastic acrylic copolymer to impregnate an acrylic print sheet, which print sheet is covered with a choice of surfacing layers.

SUMMARY OF THE INVENTION

This invention relates to a unitary heat and pressure consolidated laminate comprising (A) a rigidity imparting base member, (B) a decorative sheet member impregnated with melamine-formaldehyde resin and with a soft thermoplastic acrylic-copolymer with a glass transition temperature of less than 25° C. and (C) a compressed layer of a fibrillated acrylic fiber paper of at least 20 lbs. basis weight, said paper having been transparentized during the heat and pressure consolidation step and having been substantially free of any impregnating resin. More particularly, the decorative sheet member above is impregnated with a melamine-formaldehyde resin and with a soft thermoplastic acrylic copolymer of from 60% to 99% by weight of an alkyl ester of acrylic acid, from 1% to about 5% of an acrylic acid and from 0% to 39% of an alkyl ester of an alkyl-acrylic acid, said copolymer having a transistion temperature of less than about 25° C. The decorative laminates of the present invention have a unique combination of chemical and physical properties. These properties are of eminent desirability in many different areas of veneer surfacing application. The laminates can be produced at a cost which is comparative with presently used materials which have less suitable end use characteristics. The combination of physical and chemical properties can be classified into two principal sub-classes. These combinations of properties display themselves as excellent resistance to scuff, mar, abrasion, steam and stain. Secondly, these laminates display high impact strength, resistance to radial cracking, good dimensional stability, excellent formability, excellent flexibility, machinability and handleability. The thin laminates have outstanding formability; for example, a 0.017" laminate can readily be bent around a 1/16" or less outside radius.

The laminates of the present invention have three principal essential layers. Any of a plurality of conventional materials can be employed as the base or core member in the novel laminated articles of this invention. This is due primarily to the fact that the base member cannot be seen when the laminate is in use, and also because this part of the laminate is not subjected to the same degree of wear as the decorative surface. The base member functions to impart rigidity to the laminate, and comprises a solid substrate which may or may not be formed prior to the initial laminating step, e.g., a plurality of sheets of kraft paper impregnated throughout and bonded with a substantially completely cured phenolic resin which has been converted to the thermoset state during the initial laminating step, a precured plastic laminate, such as glass fiber-reinforced thermoset polyester resin laminates and the like, a wood product, such as hardboard, woodwaste or particle boards, plywood, and the like, a mineral base board, such as an epoxy-polyamine resin-treated cement asbestos board, asbestos fiber sheet impregnated with phenolic resins, sheet rock, plasterboard and the like, or a combination of these substrates, e.g., a combination of a plurality of phenolic resin-impregnated kraft paper sheets over a piece of cement-asbestos board, particle board, or the like. The core sheets are conventional unbleached kraft paper sheets which have been pre-impregnated with a thermosetting resin such as a thermosetting phenol formaldehyde resin. As indicated hereinabove, for very thin laminates, only one core sheet is required; but for slightly thicker or very thick laminates, one may use two, three, five, seven or eight core sheets all of which have been pre-impregnated with a thermosetting phenolic resin.

The decorative sheet is generally a very fine quality paper such as alpha-cellulose, bleached sulfite, bleached kraft or a fibrillated acrylic fiber paper and others which have been impregnated with a thermosetting melamine-formaldehyde resin. More particularly, the melamine resin may be a conventional melamine laminating resin made by reacting melamine and formaldehyde in aqueous solution or it may be a methylated derivative of the melamine formaldehyde reaction product. These resins are shown in the U.S. Pat. 2,197,357 which is incorporated herein by reference. The decorative sheet after the impregnation with the melamine resin is then dried and treated with a soft thermoplastic acrylic-copolymer with a glass transition temperature less than 25° C. or compatible blend of acrylic copolymers. Additionally, one may use a compatible blend of our soft thermoplastic acrylic copolymer with a hard thermoplastic acrylic copolymer such as those shown in the U.S. Pat. 3,220,916; which patent is incorporated herein by reference. When such blends of soft and hard acrylic copolymers are used, proportions of the two components must be such that the blend still has a glass transition temperature less than about 25° C. As a consequence, if the glass transition temperature is significantly below 25° C. larger amounts of the hard thermoplastic acrylic copolymers may be used. On the other hand when the glass transition temperature of the soft thermoplastic acrylic copolymer is not appreciably below 25° C., lesser amounts of the hard thermoplastic acrylic copolymer should be used or left out altogether. The soft thermosetting acrylic copolymer is prepared by polymerizing from about 60% to about 99%, by weight, of an alkyl ester of acrylic acid and from about 1% to about 5% of an acrylic acid such as acrylic acid per se or methacrylic acid, alphachloroacrylic acid, and the like; and from about 0% to about 39%, by weight, of an alkyl ester of an alkyl-acrylic acid. It is required that the polymer shall have a glass transition temperature of less than about 25° C. Among the alkyl esters which may be used in preponderant amounts in the copolymer of the present invention are those prepared by reacting acrylic acid with an aliphatic monohydric alcohol containing from 1 to 8 carbon atoms such as methanol, ethanol, propanol, isopropanol, normal butanol, iso-butanol, 2 ethyl-hexanol, and the like. It is actually preferred that the polymer be only a two component copolymer comprising the alkyl ester of acrylic acid and an acrylic acid. When these two components alone are used there should be present between about 95% to 99%, by weight, of the alkyl ester of acrylic acid and correspondingly to about 5% to about 1%, by weight, of an acrylic acid. The alkyl esters of the alkyl-acrylic acid shall be present in amounts varying between about 0% and 39% based on the total weight of the reactants of the copolymer. The same monohydric aliphatic alcohols used to prepare the principal components of the copolymer can be used to make the esters of the alkyl-acrylic acid. Since alkyl esters of methacrylic acid, such as methylmethacrylate, have a tendency to diminish the soft characteristic of the thermoplastic copolymer, said alkyl ester can be left out altogether or used in less than preponderant amounts as is outlined hereinabove. The interrelated percentages set forth hereinabove in any given copolymer, terpolymer, and the like always add up to 100%.

An alternative procedure for impregnating the decorative sheet with the melamine resin and then with the soft acrylic copolymer can be accomplished by blending the melamine resin and the soft acrylic thermoplastic copolymer latex into a unitary impregnating bath; and by passing the decorative sheet therethrough one will accomplish simultaneously the impregnation of the paper fibers with the melamine resin and the coating of the impregnated sheet with the soft thermoplastic copolymer composition. The soft thermoplastic acrylic polymeric material used in the laminates of the present invention should have a molecular weight between about 10,000 and 1,000,000 as determined by standard intrinsic viscosity measurements.

The unbleached kraft paper which constitutes the base member and/or core sheet(s) should have a basis weight (3,000 sq. ft. ream size) of about 40 to 135 lbs. and preferably 110 lbs. is impregnated with a conventional phenolic laminating resin to a content of 25%–35%, by weight, resin solids. The decorative sheet member is bonded in certain instances directly to the base member and may be comprised of an alpha-cellulose fiber paper having a basis weight (3,000 sq. ft. ream size) of about 40 to 125 lbs. and preferably 60 to 90 lbs. Said paper is suitably pigmented and/or printed before the impregnation with the melamine resin and soft thermoplastic acrylic polymeric material either simultaneously or successively in that order.

The surface sheet is an unimpregnated substantially resin free paper sheet made from a fibrillated acrylic fiber described in the prior art in the U.S. Pats. Nos. 2,810,646 and 3,264,170. In order to achieve good stain, steam and abrasion resistance, the basis weight (3,000 sq. ft. ream size) of this paper should be at least 20 lbs. and preferably 25–35 lbs. In order to achieve a smooth appearance in the ultimate laminate, the paper should also have a good formation. As used, this fibrillated acrylic fiber paper is substantially completely free of any resin impregnation. During the heat and pressure consolidation step, however, it is suspected that a small measure of the soft acrylic copolymer migrates upwardly to a limited extent into the fibrillated paper; but the paper does not become fully impregnated in the strict sense of the word. During the laminating operation the fibrillated sheet is rendered transparent by the exclusion of air and the limited fusion of the polymer fibers; and although the surface member appears to be non-porous film, it should not properly be classified as a film in the strict usual sense because much of the fibrous structure remains and is visible on microscopic examination. The physical properties of such a laminate differ considerably from those in which a polyacrylonitrile film is used as a surfacing layer in the production of a laminate, and the differences are very significant and are held responsible for the improved novel characteristics of the laminate of the present invention as contrasted with those prepared by using a non-porous film of polyacrylonitrile as the starting film. When a blend of the acrylic polymer/melamine resin is used in a one step impregnating operation, the copolymer/melamine resin weight ratio may be varied between about 95:5 and 25:75 and preferably at about 75:25 acrylic polymer to melamine resin solids respectively. When a two step technique is used the decorative sheet is first passed through a melamine resin solution in which about 2–30% but preferably 10–20% pick-up of the melamine resin solids is first achieved followed by a drying step followed by about 10–40% but preferably 20–30% pick-up of the acrylic resin. In such a two step operation the total resin pick-up is 40% but can be varied between about 35% and 45% total resin solids. When the three essential laminae, requisite in the structure of the present invention, are collated between suitable release sheets such as aluminum foil, silicone or wax treated papers and the like, one or more of such assemblies are inserted into a flat-bed press and heat and pressure consolidated at temperatures of 140–150° C. or higher, under pressures of 1,000 to 3,000 p.s.i. or higher, for about 5–30 minutes. If it is desired to modify the basic structure of the laminate of the present invention one may insert an aluminum foil between the decorative sheet and the uppermost face of the core sheet(s). The presence of such a foil enhances the properties of the sheet from the standpoint of heat resistance and particularly cigarette burn resistance. The standard high pressure laminates of the prior art, having a melamine-formaldehyde impregnated alpha-cellulose sheet surface, meet the NEMA requirements (National Electrical Manufacturers Association's Standards for Laminated Thermosetting Sheets) and have excellent properties; but when they are made in a 1/16" thickness they have limited formability to a bending radii of not less than 0.5", usually not less than 0.625". This shortcoming imposes severe limitations on furniture designers who wish to veneer bends to about 1/16", thus approximating right angle corners. The conventional high pressure laminates of the prior art cannot be reduced in thickness so as to overcome the bending problem without introducing new application problems. For instance at a thickness of 1/32", it can only be used in widths of up to 16" to 24". Wider laminates of this thickness are found to suffer from severe radial cracking from the inherent dimensional instability of this type of laminate. If the laminate decreases in thickness below about 1/32" it becomes too brittle to handle whereas the thin decorative laminate of the present invention has none of these disadvantages.

In order to meet the demand for flexible, formable decorative surfacing materials various thermoplastic films are being offered to furniture manufacturers such as a 6 mil, back-printed polyvinylchloride film. Since the film has been plasticized, it can be wrapped around the sharpest corners and meets many of the requirements such as high impact strength, resistance to radial cracking, and the like. However, its machinability is questionable and it is particularly unsatisfactory in scuff, mar, steam and stain resistance.

It is imperative that the fibrillated acrylic fiber paper sheet used in the manufacture of the laminates of the present invention be substantially completely devoid of any impregnating resin. It may contain non-resinous modifiers such as anti-static agents, fiber brighteners and the like. If the fibrillated acrylic fiber paper is impregnated with a resin before use either the excellent stain resistance of the fused acrylic paper is adversely affected or brittleness problems develop. During the heat and pressure consolidation step some of the resin blend in the decorative sheet flows into the lower part of the acrylic paper; and by doing so, gives an excellent inter-laminar bond which is partially responsible for the bond strength in the laminate. The bond strength is not measurable by known techniques because the two laminations cannot be separated by any conventional means. One of the conventional techniques used to measure bond strength resides in forcing a separation between the layers to be separated using a sharp instrument such as a knife and applying and measuring a pulling force to achieve delamination.

When a very low base weight acrylic paper is used, the upward resin flow from the decorative sheet will for all practical purposes effectively impregnate the whole sheet. This is undesirable because it lends to a severe deterioration of stain resistance and represents one of the main reasons for specifying that the acrylic paper base weight shall be at least 20 lbs.

In order that the concept of the present invention may be more completely understood the following examples are set forth in which all parts are used by weight. These examples are set forth primarily for the purpose of illustration.

EXAMPLE 1

The following assembly was prepared in surperimposed relationship from top to bottom, an aluminum release sheet; an unimpregnated fibrillated acrylic paper sheet of basis weight, 30 lbs.; a decorative sheet of printed, 65 lbs., alpha-cellulose paper impregnated with a 75/25 acrylic latex/melamine resin blend to a 39% pick-up; a core sheet of unbleached kraft paper, basis weight equal to 110 lbs. and impregnated with a thermosetting phenolic resin to a pick-up of 30%; and finally, a back release sheet of silicone treated paper. The acrylic latex contained a copolymer of 95 parts ethyl acrylate and 5 parts of acrylic acid. Thirty such llaminates were pressed together in a face-to-face buildup. The laminates were prepared by pressing the assembly described hereinabove in a flat-bed press at 1400 p.s.i., 145° C. top temperature held for 15 minutes, time to reach this temperature equal to 15 minutes and time to cool to 35° C. equal to 15 minutes. The laminates thus produced were removed from the press and were evaluated by standard NEMA test procedures to give the results in the following table.

COMPARISON OF PROPERTIES

| Property | Example No. 1 values | Standard 1/32" laminate values | Test method |
| --- | --- | --- | --- |
| Thickness (inches) | 0.016 | 0.320 | |
| Abrasion: | | | |
| Cycles | 345 | 540 | } LD 1-2.01. |
| Rate | 0.048 | 0.059 | |
| Steam exposure (hours to show whitening). | >24 | 4 | Sample is placed, face downwards 6" over the surface of boiling water. |
| Dimensional change (percent): | | | |
| Length | 0.175 | 0.36 | } LD 1-2.08. |
| Cross | 0.557 | 0.74 | |
| Drop ball impact (inch) | 116 | 18–24 | LD 1-2.15. |
| Stains: | | | |
| Superficial | None | None | } LD 1-2.05. |
| Severe | None | None | |
| Fadeometer | (¹) | (¹) | LD 1-2.06. |
| Formability (inches min. radius): | | | |
| Length | 0 | 0.2 | } LD 1-2.11. |
| Cross | 0.06 | 0.2 | |
| Radial crack | (¹) | (²) | Radial cracking control test for decorative laminates.³ |
| Cigarette test (seconds) | 10 | 58 | LD 1-2.04. |

¹ No effect.
² Cracks in standard test (4 ft. widths).
³ A test method to determine the stability of decorative high pressure laminates when veneered to particleboard substrate under simulated extremes of normal field fabricating conditions.

EXAMPLE 2

Example 1 is repeated in all essential details except that a maximum pressure of 1100 p.s.i. was used. The laminates produced were substantially identical with those obtained from Example 1.

EXAMPLE 3

Example 1 is repeated in all essential details except that instead of using the flat-bed press, the collated assembly was passed through the apparatus described in the U.S. Pat. 3,159,526 (this patent is incorporated herein by reference) with a platen temperature of 490° F. and a belt speed of 3 ft./min. The laminates thus produced had substantially identical physical properties as those produced by Example 1.

EXAMPLE 4

Example 1 is repeated in all essential details except that the aluminum release sheet is replaced by ³⁄₃₂" stainless steel press plates and the laminate pressure is increased to 2500 p.s.i. The properties of the laminate thus produced are substantially like those produced in Example 1.

EXAMPLE 5

Example 1 is repeated in all essential details except that a 60 lb. basis weight fibrillated acrylic paper is used. The properties of the laminate thus produced are substantially like those produced in Example 1 except that improved abrasion resistance of 700 revolutions or higher are obtained.

EXAMPLE 6

Example 1 was again repeated in all essential details except that the 30 lb. basis weight of acrylic fiber paper was replaced by a 16 lb. basis weight acrylic paper. The laminates thus produced displayed that the steam and stain resistance had deteriorated severely and the surface of the decorative laminate was severely affected by such conventional organic liquids as esters, alcohols and ketones. Lower abrasion resistance was also evident.

EXAMPLE 7

Another group of laminates were prepared according to Example 1 except that in the place of the acrylic paper surface sheet there was used a non-woven fabric of acrylic fibers. The laminate thus produced was inferior to those described in Example 1, particularly in the formability which increased to ⅛" and the laminate was severely stained by shoe polish, dye, ink, 1% iodine solution and 2% mercurochrome solution.

EXAMPLE 8

Example 1 is repeated essentially in all details except that the alpha-cellulose paper is impregnated with a 50/50 acrylic latex-melamine resin blend to a 41% resin pick-up. The properties of the laminate are essentially comparable to those described in Example 1 with the exception that the impact resistance is reduced to about 84 inches.

EXAMPLE 9

A laminate was made according to Example 1 except that the resin used to impregnate the decorative sheet was 100% melamine resin and no soft thermoplastic acrylic co-polymer was present. The laminate thus produced had an impact strength of 18" and was too brittle to be machineable.

EXAMPLE 10

Example 1 is repeated essentially in all details except prior to laminating the decorative paper, it is impregnated with a hard acrylic copolymer resin as specified by U.S. Pat. 3,220,916. The properties of the laminate thus produced are inferior to those obtained in Example 1. The impact resistance is reduced to 44", steam resistance is reduced to less than one hour after which time the surface delaminated and the surface is affected by a variety of organic solvents.

EXAMPLE 11

Example 1 is repeated essentially in all details except that prior to laminating the acrylic overlay paper is impregnated with the acrylic copolymers as specified in U.S. Pat. No. 3,220,916. The properties thus produced are the same as Example 10 hereinabove.

EXAMPLE 12

Example 1 is repeated essentially in all tetails except that the thickness of the laminate is increased to about .031" by adding two core sheets of the phenolic impregnated kraft to the assembly. The properties of the laminate thus produced are substantially equivalent to Example 1 except for increased stiffness and the postformability is reduced to .330" radius.

EXAMPLE 13

Laminates were prepared according to the process of Example 1 except that a sheet of 0.002" aluminum foil was placed below the decorative sheet and the core sheet was impregnated with the same resin blend as was used in the decorative sheet instead of the phenolic resin. The laminates thus produced were also evaluated by standard NEMA test procedures and found to have comparable properties to those described in Example 1 with the exception that the improved heat resistance gives a cigarette resistance of greater than 600 seconds.

EXAMPLE 14

Example 1 is repeated in all essential details except that the alpha-celulose paper is impregnated with a blend 90 parts by weight of the acrylic latex and 10 parts by weight of hexamethoxymethyl melamine. The properties of the laminate are substantially identical to those of Example 1.

We claim:

1. A unitary heat and pressure consolidated laminate having a paper like top surface comprising (A) a rigidity imparting base member onto which is superimposed (B) a decorative sheet member with its decorative side facing upwardly impregnated throughout with a melamine-formaldehyde resin and coated at least on the decorative side with a soft thermoplastic acrylic copolymer with a glass transition temperature of less than about 25° C. and onto which is superimposed (C) a compressed layer of a fibrillated acrylic fiber paper of at least 20 lbs. basis weight, said paper having been transparentized by limited fusion of the fibers of said paper during the heat and pressure consolidation step and having been substantially free of any impregnating resin prior to the heat and pressure consolidation step and in the final product.

2. The decorative laminate according to claim 1 in which the decorative sheet member is impregnated with a melamine-formaldehyde resin and coated at least on the decorative side with a soft thermoplastic acrylic copolymer of from 60% to 99%, by weight, of an alkyl ester of acrylic acid, from 1% to about 5% of an acrylic acid and from 0% to 39% of an alkyl ester of alkyl-acrylic acid, said copolymer having a glass transition temperature of less than about 25° C.

3. The laminate according to claim 1 in which the acrylic copolymer is composed of from about 95% to 99% of an alkyl ester of acrylic acid and correspondingly from about 5% to 1% of an acrylic acid.

4. The laminate according to claim 3 in which the alkyl ester is butyl acrylate and the acrylic acid is methacrylic acid.

5. The laminate according to claim 3 in which the alkyl ester is ethyl acrylate and the acrylic acid is acrylic acid per se.

6. The decorative laminate according to claim 2 in which the decorative sheet is impregnated to a 40% resin solids content with a blend of about 5 to 75 parts, by weight, of a thermosetting melamine-formaldehyde resin and correspondingly from about 95 to 25 parts, by weight, of an acrylic emulsion.

7. A decorative laminate according to claim 2 in which the decorative sheet is impregnated to a 40% resin solid content with a blend of about 25 parts melamine-formaldehyde resin and correspondingly with about 75 parts, by weight, of an acrylic emulsion.

8. The laminate according to claim 1 in which an aluminum foil is positioned beneath the decorative sheet.

9. The laminate according to claim 1 in which the acrylic fiber paper has a basis weight of 25-35 lbs.

10. A decorative laminate according to claim 1 in which there is positioned between the base sheet and the decorative sheet between one and nine core sheets of kraft paper impregnated with a thermosetting resin.

References Cited

UNITED STATES PATENTS

| | | | |
|---|---|---|---|
| 3,220,916 | 11/1965 | Petropoulos | 161—156 |
| 3,278,365 | 10/1966 | Adams et al. | 161—151 |
| 3,340,137 | 9/1967 | Rasim-Kamal | 161—248X |
| 3,345,248 | 10/1967 | Pounds et al. | 161—248 |
| 3,365,354 | 1/1968 | Britton | 161—150 |
| 3,403,071 | 9/1968 | Perry | 161—189 |
| 3,458,391 | 7/1969 | Miller | 161—248 |

JOHN T. GOOLKASIAN, Primary Examiner

C. B. COSBY, Assistant Examiner

U.S. Cl. X.R.

161—155, 156, 218, 219, 248, 254, 256, 257

UNITED STATES PATENT OFFICE
CERTIFICATE OF CORRECTION

Patent No. 3,589,974　　　　　Dated June 29, 1971

Inventor(s) Donald Joseph Albrinck; Alfred Thomas Guertin

It is certified that error appears in the above-identified patent and that said Letters Patent are hereby corrected as shown below:

Column 1, line 54, "possibility" should read -- possibly --. Column 2, line 7, "artticles" should read -- articles --. Column 6, line 34, "0.320" should read -- 0.032 --. Column 7, line 70, "tetails" should read -- details --.

Signed and sealed this 25th day of January 1972.

(SEAL)
Attest:

EDWARD M. FLETCHER, JR.　　　　　ROBERT GOTTSCHALK
Attesting Officer　　　　　　　　　Commissioner of Patents